(12) United States Patent
Libin

(10) Patent No.: US 9,147,131 B2
(45) Date of Patent: Sep. 29, 2015

(54) EXTRACTING MULTIPLE FACIAL PHOTOS FROM A VIDEO CLIP

(71) Applicant: Evernote Corporation, Redwood City, CA (US)

(72) Inventor: Phil Libin, San Jose, CA (US)

(73) Assignee: Evernote Corporation, Redwood City, CA (US)

( * ) Notice: Subject to any disclaimer, the term of this patent is extended or adjusted under 35 U.S.C. 154(b) by 193 days.

(21) Appl. No.: 13/897,938

(22) Filed: May 20, 2013

(65) Prior Publication Data

US 2014/0029859 A1    Jan. 30, 2014

Related U.S. Application Data

(60) Provisional application No. 61/677,093, filed on Jul. 30, 2012.

(51) Int. Cl.
G06K 9/62 (2006.01)
G06K 9/00 (2006.01)
G06K 9/03 (2006.01)

(52) U.S. Cl.
CPC .......... *G06K 9/6267* (2013.01); *G06K 9/00221* (2013.01); *G06K 9/00302* (2013.01); *G06K 9/036* (2013.01)

(58) Field of Classification Search
CPC . G06K 9/6267; G06K 9/00221; G06K 9/036; G06K 9/00302
USPC .................................................. 382/118, 224
See application file for complete search history.

(56) References Cited

U.S. PATENT DOCUMENTS

| | | |
|---|---|---|
| 2002/0049728 A1 | 4/2002 | Kaku |
| 2005/0129290 A1 | 6/2005 | Lo et al. |
| 2010/0079613 A1 | 4/2010 | Karimoto et al. |
| 2010/0134588 A1* | 6/2010 | Kim .......................... 348/14.02 |
| 2010/0189356 A1 | 7/2010 | Sugita |
| 2011/0058713 A1* | 3/2011 | Kogane et al. ................ 382/118 |
| 2012/0188382 A1 | 7/2012 | Morrison et al. |
| 2012/0188405 A1 | 7/2012 | Morrison et al. |
| 2012/0191709 A1 | 7/2012 | Morrison et al. |
| 2013/0165197 A1* | 6/2013 | Glikmann ........................ 463/9 |
| 2013/0212463 A1 | 8/2013 | Pachikov et al. |

* cited by examiner

Primary Examiner — Gregory M Desire
(74) Attorney, Agent, or Firm — Muirhead and Saturnelli, LLC

(57) ABSTRACT

Extracting an optimal subset of facial photographs includes obtaining an initial set of facial photographs, removing from the initial set photographs any photographs that are of unacceptable quality, grouping a remaining set of photographs according to view angle, removing from the remaining set of photographs any photographs having an undesirable facial expression to provide a limited set of representative facial photographs, and, selecting, from the limited set of facial photographs, an optimal subset of facial photographs. Obtaining the initial set of photographs may include using a video camera while diversifying view angles and controlling recording quality. Obtaining the initial set of photographs may include obtaining a series of still images. The still images may be self-recorded by a person with a smartphone front-facing camera.

36 Claims, 10 Drawing Sheets

EXTRACTING MULTIPLE FACIAL PHOTOS FROM A VIDEO CLIP

CROSS-REFERENCE TO RELATED APPLICATIONS

This application claims priority to U.S. Prov. App. No. 61/677,093, filed Jul. 30, 2012, and entitled "METHOD AND PROCESS FOR EXTRACTING MULTIPLE FACIAL PHOTOS FROM A VIDEO CLIP", which is incorporated herein by reference.

TECHNICAL FIELD

This application is directed to the field of extracting, analyzing, presenting and communicating information.

BACKGROUND OF THE INVENTION

Today's solutions for contact management include contact lists in Personal Information Management (PIM) software, buddy lists, connections, contacts, friends, circles, aspects and other individual and group contact concepts present on desktops, mobile devices, as well as general purpose and professional networks. These solutions emphasize the existence and sometimes the category of connections between participants (such as former colleagues, doing business together, referred by third person, etc.) but often offer little tools and information helping understand the dynamics and history of relations between contacts in conjunction with their meetings and mutual experiences. An increasing number of people who are meeting each other for the first time in a social environment lack easy-to-use, secure, compelling and socially acceptable tools for exchanging personal information between their mobile devices and capturing personal context and dynamics within contact management applications. It should also be noted that members of social networks who are meeting each other in-person rarely need exchanging extensive amounts of personal contact information between them: once a key piece of such information, such as an email address, is known, the rest can often be extracted from social networks.

Mobile devices with cameras, loaded with software like Evernote Hello, are putting real-life and virtual meetings ("encounters") at the center of memorizing and retrieving contact profiles. Chronologically ordered photos of people met by an individual, such as "people mosaic" in the Evernote Hello or "photo wall" in the ContactFlow contact management software emphasize contact photos as one of the most efficient ways to memorize people. The role of personal photos in contact management is constantly increasing; applications are starting to use multiple contact photos to enhance communications experience in the personal and business space. Methods have been proposed for optimal capturing contact photos by participants of an encounter; thus, the Evernote Hello software includes an instructional UI working with device sensors to optimize a view angle for best capturing of facial photos. Still, multiple contact photos are in many cases non-representative; when such images are collected from social networking sites or are based on sporadic personal photos taken at different times and under different conditions, they may have significant variations in size, image quality and lack consistency, expressiveness and thoroughness.

Accordingly, it is desirable to develop cohesive methods and processes for capturing multiple facial photos with different view angles and personal expressions for use with contact management software and other applications.

SUMMARY OF THE INVENTION

According to the system described herein, extracting an optimal subset of facial photographs includes obtaining an initial set of facial photographs, removing from the initial set photographs any photographs that are of unacceptable quality, grouping a remaining set of photographs according to view angle, removing from the remaining set of photographs any photographs having an undesirable facial expression to provide a limited set of representative facial photographs, and, selecting, from the limited set of facial photographs, an optimal subset of facial photographs. Obtaining the initial set of photographs may include using a video camera while diversifying view angles and controlling recording quality. Obtaining the initial set of photographs may include obtaining a series of still images. The still images may be self-recorded by a person with a smartphone front-facing camera. Grouping the remaining set of photographs may include creating groups of photographs selected from a plurality of the following: photographs of a front full-face view, photographs of a profile view, photographs of a ¾ view, and photographs of a ⅔ view. Removing photographs of unacceptable quality may include removing from the initial of set photographs any photographs having an incomplete facial view, any blurry photographs, and any photographs having an extreme angle leaving too little of a recognizable facial area. Removing from the remaining set of photographs any photographs having an undesirable facial expression may include removing photographs showing at least one of: fear, anger, disgust, and sadness. Facial expressions may be automatically detected by software. Selecting, from the limited set of facial photographs, an optimal subset of facial photographs may include having a user review several suboptimal candidate sets of facial photograph and manually select the optimal set of photographs therefrom. Selecting, from the limited set of facial photographs, an optimal subset of facial photographs may include using closeness of the limited set of facial photographs to ideal prototypes for particular facial expressions and angles and diversity of facial expressions of the limited set of facial photographs in a two-component multi-dimensional space of facial expressions and view angles.

According further to the system described herein, editing an electronic contact includes modifying text fields of the electronic contact, removing from an initial set of photographs any photographs that are of unacceptable quality, grouping a remaining set of photographs according to view angle, removing from the remaining set of photographs any photographs having an undesirable facial expression to provide a limited set of representative facial photographs, selecting, from the limited set of facial photographs, an optimal subset of facial photographs, and adding at least one photograph of the optimal subset of facial photographs to the electronic contact. The initial set of photographs may include frames obtained by using a video camera while diversifying view angles and controlling recording quality. The initial set of photographs may include a series of still images. The still images may be self-recorded by a person with a smartphone front-facing camera. Grouping the remaining set of photographs may include creating groups of photographs selected from a plurality of the following: photographs of a front full-face view, photographs of a profile view, photographs of a ¾ view, and photographs of a ⅔ view. Removing photographs of unacceptable quality may include removing from the initial of set photographs any photographs having an incomplete facial view, any blurry photographs, and any photographs having an extreme angle leaving too little of a recognizable facial area. Removing from the remaining set of photographs any photographs having an undesirable facial expression may include removing photographs showing at least one of: fear, anger, disgust, and sadness. Facial expressions may be automatically detected by software. Selecting, from the limited set of facial photographs, an optimal subset of facial photographs may include having a user review several suboptimal candidate sets of facial photograph and manually select the optimal set of photographs therefrom. Selecting, from the limited set of facial photographs, an optimal subset of facial photographs may include using closeness of the limited set of facial photographs to ideal prototypes for particular facial expressions and angles and diversity of facial expressions of the limited set of facial photographs in a two-component multi-dimensional space of facial expressions and view angles.

According further to the system described herein, computer software, provided in a non-transitory computer-readable medium, extracts an optimal subset of facial photographs. The software includes executable code that removes from an initial set photographs any photographs that are of unacceptable quality, executable code that groups a remaining set of photographs according to view angle, executable code that removes from the remaining set of photographs any photographs having an undesirable facial expression to provide a limited set of representative facial photographs, and executable code that selects, from the limited set of facial photographs, an optimal subset of facial photographs. The initial set of photographs may include frames obtained using a video camera while diversifying view angles and controlling recording quality. The initial set of photographs may include a series of still images. The still images may be self-recorded by a person with a smartphone front-facing camera. Executable code that groups the remaining set of photographs may create groups of photographs selected from a plurality of the following: photographs of a front full-face view, photographs of a profile view, photographs of a ¾ view, and photographs of a ⅔ view. Executable code that removes photographs of unacceptable quality may remove from the initial of set photographs any photographs having an incomplete facial view, any blurry photographs, and any photographs having an extreme angle leaving too little of a recognizable facial area. Executable code that removes from the remaining set of photographs any photographs having an undesirable facial expression may remove photographs showing at least one of: fear, anger, disgust, and sadness. Executable code that selects, from the limited set of facial photographs, an optimal subset of facial photographs may use closeness of the limited set of facial photographs to ideal prototypes for particular facial expressions and angles and diversity of facial expressions of the limited set of facial photographs in a two-component multi-dimensional space of facial expressions and view angles.

According further to the system described herein, computer software, provided in a non-transitory computer-readable medium, edits an electronic contact. The software includes executable code that modifies text fields of the electronic contact, executable code that removes from an initial set of photographs any photographs that are of unacceptable quality, executable code that groups a remaining set of photographs according to view angle, executable code that removes from the remaining set of photographs any photographs having an undesirable facial expression to provide a limited set of representative facial photographs, executable code that selects, from the limited set of facial photographs, an optimal subset of facial photographs, and executable code that adds at least one photograph of the optimal subset of facial photographs to the electronic contact. The initial set of photographs may include frames obtained using a video camera while diversifying view angles and controlling recording quality. The initial set of photographs may include a series of still images. The still images may be self-recorded by a person with a smartphone front-facing camera. Executable code that groups the remaining set of photographs may create groups of photographs selected from a plurality of the following: photographs of a front full-face view, photographs of a profile view, photographs of a ¾ view, and photographs of a ⅔ view. Executable code that removes photographs of unacceptable quality may remove from the initial of set photographs any photographs having an incomplete facial view, any blurry photographs, and any photographs having an extreme angle leaving too little of a recognizable facial area. Executable code that removes from the remaining set of photographs any photographs having an undesirable facial expression may remove photographs showing at least one of: fear, anger, disgust, and sadness. Executable code that selects, from the limited set of facial photographs, an optimal subset of facial photographs may use closeness of the limited set of facial photographs to ideal prototypes for particular facial expressions and angles and diversity of facial expressions of the limited set of facial photographs in a two-component multi-dimensional space of facial expressions and view angles.

Managing personal contact information may be based on several notions: an encounter, a contact profile and a personal contact space. An encounter is a communications session that includes two or more participants and has a mutual theme shared by participants, such as in-person meetings, audio/video conferences, chat sessions, email messages received within a correspondence thread; etc. Any content recorded by meeting participants and shared between the participants may belong to the encounter and so does the content that has been captured during an encounter or associated with such encounter by each participant who is looking to include the encounter into the personal contact space (an owner of personal contact space). Captured content may include notes, photos, audio and video clips taken during an encounter; associated content may include Web references or pages, documents, past notes, etc. that have been selected by participants as a relevant content for an encounter. The combination of all encounters, contacts and related content constitutes a personal contact space of the owner thereof. Querying the personal contact space for a particular contact reveals a contact profile—the timeline of encounters where that contact participates, including places, other associated contacts who participated in the encounters, and any accompanying materials. The set of contact profiles enables owners to take a deeper look into their own memories and to recall important socialization events and related people. For example, an owner of personal contact space may retrieve forgotten contact information implicitly, by recalling an encounter with another, better memorized person where the desired contact information was captured.

From the standpoint of a personal contact space of an owner, each encounter may include both existing and new contacts of the participants thereof. Accordingly, multiple techniques for capturing and sharing contact information by and with participants of an encounter may be provided. In one embodiment, owners pass on their mobile devices with a blank personal contact form displayed on device screens to other participants who can them type in their personal information into the form, take personal photos on owner's device to add it to their contact info, as explained elsewhere herein;

etc. In another embodiment, participants may type in only a key portion of their information, such as an email address, into an owner's copy of contact form; after that, the system logs in to social networks, such as LinkedIn, Facebook, Tumblr, or Twitter and retrieves the rest of participants' contact information, including photos, from such networks. Prior to retrieving participants' contact information from social networks, owners or participants may take photos of participants' business cards, which are then processed by the system for automatic optical character recognition (OCR) in order to retrieve the most important information from such cards, email address and name, and feed the retrieval mechanism as explained above. In yet another embodiment, the system may extract email addresses or other significant identifiers of participants from an email thread and subsequently may retrieve, by owner's request, additional contact information of participants who have not previously been included in owner's personal contact space or whose info, in owner's opinion, may need upgrading, from social networks. In another embodiment, during an in-person encounter, the system may identify the presence of participants in one place using location-aware technology such as GPS; the system may then offer each participant (as an owner) exchanging contact information stored online in their own personal contact spaces, which may be part of a broader personal information management system such as Evernote. Transferring contact information from personal online accounts may require additional authorization.

In the context of a personal contact space, the system for optimal capturing of multiple facial photos for a personal contact space may support different scenarios with respect to a disposition of participants and a capturing method. A set of photos may be self-taken by the personal contact space owner and added to the contact profile for sharing with new contacts during encounters. Alternatively, an owner of a personal contact space may capture photos of other participants of an encounter and store the photos in copies of their shared profiles in the owner's contact space, possibly in addition to photos already included by participants into their profiles and shared with the owner of a personal contact space. In some embodiments, combined social and personal profiles of encounter participants stored within personal contact spaces of others may be used to provide additional diversification of user experiences.

The proposed capturing method for multiple personal photos is based on extracting characteristic photos from a series of frames comprising a short video clip or a background recording of multiple still shots taken with a smartphone camera. A video clip or a series of photos may be taken with either a front or a back facing phone camera depending on the scenario and conditions. In a scenario where a video clip of an encounter participant is recorded by another person, the use of a back-facing camera may be more likely, since a back-facing camera allows the recording individual to better control the view of the recorded person. On the other hand, when a series of still photos is self-taken by a user, using a front-facing camera (if available) in an active camera mode for a contact profile of the user, the phone screen may offer additional benefits, such as self-controlling personal views and displaying instructions on the capturing process by the system. In nearly all scenarios, frames with facial images are taken from different view angles and photographed individuals sometimes show different facial expressions.

After a raw frame set provided as a video clip or as a collection of still frames has been obtained, the set may be processed in several steps using a commercially available image and facial recognition software, such as FaceReader by Noldus Information Technology, nViso SA facial imaging technology or Affdex by Affectiva, Inc. First, facial fragments are detected on each frame; frames where the system was unable to reliably detect a complete facial fragment are discarded. At a next step, lighting conditions, contrast and crispness of facial fragments are estimated on the remaining frames. Frames with low quality facial images are dropped, too. Subsequently, horizontal and vertical view angles for each of the remaining facial fragments are estimated; frames with extreme view angles not revealing facial expressions, such as straight bottom-up or rear view, are discarded as well. At a next step, the system groups the remaining frames with acceptable view angles by typical facial views, for example, a front (full-face) view, a profile view, a ¾ view, a ⅔ view, etc.

Subsequently, each group of photos representing a particular facial view may be analyzed for diverse facial expressions, or moods, such as smiling, tight-lipped or worried, using characteristic facial elements, keypoints and/or other features of automatic facial expression recognition systems. It should be noted that particular sets of facial expressions recognized by the system in different embodiments, may depend on the available options in a third party software used within the system; thus, certain versions of the FaceReader software or the nViso 3D facial imaging technology recognize only six facial expressions: happiness, surprise, fear, anger, disgust, and sadness, while nViso 3D facial imaging technology, as well as Face Recognition System by Luigi Rosa add a neutral expression. It should be noted that only a limited set of emotional states revealed by facial expressions may be suitable for contact profiles. Accordingly, frames with undesired expressions may be deleted by the system.

At the next automatic step, the system may select a minimal yet representative set of photos clipped from video frames or multiple shots and pre-processed as explained elsewhere herein. The system attempts preserving the best combination of available generic views (full-face, profile, ¾, ⅔, etc.) with diversified facial expressions available in the cleaned up frame set while deleting the rest of the frames with less revealed expressions. The resulting set may be submitted to the photographed individual (a personal space owner or a participant of an encounter) for the final selection and approval, as explained elsewhere herein. Upon an individual's choice and approval, contact photos may be stored in a personal contact space and may be made available on demand or shared with others. An owner of a personal contact space may create several multi-shot profiles aimed at different categories of requesters, such as casual, formal and travel photos. A multi-shot profile may be created incrementally: in the event that the first set of frames after its processing does not offer, in the opinion of a photographed person, a satisfactory set of facial photos, additional video clips or still photos may be captured and processed to add to the existing subset of photos or to replace certain photos in the initial set.

Additionally, smartphones equipped with a gyroscopic or other auto-detection system(s) measuring device tilt may be used in a situation where owners or encounter participants take series of still frames of themselves. Since a smartphone tilt when a user takes a head shot defines the view angle against the axis orthogonal to the phone surface and centered in the middle point of the user's face, the system may memorize the angles used throughout the series, sort out extreme angles, display appropriate instructions to diversify view angles and select the best angles for quality facial photos, such as when the phone is held slightly above the face and tilted down.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a method and process for extracting a set of representative facial photos from a short video clip or a series of still photos taken with a smartphone. The system provides different techniques for capturing the initial frame set, as explained elsewhere herein; for refining the set by dropping frames with various defects; for choosing the final set of photos and the acceptance process; for expanding the process; and for combining different sets of photos extracted using the proposed method to serve different requests. The system replaces a scattered set of personal photos extracted from different sources with a cohesive set of facial images taken under controlled conditions and assessed by a profile owner.

Figure 1A:
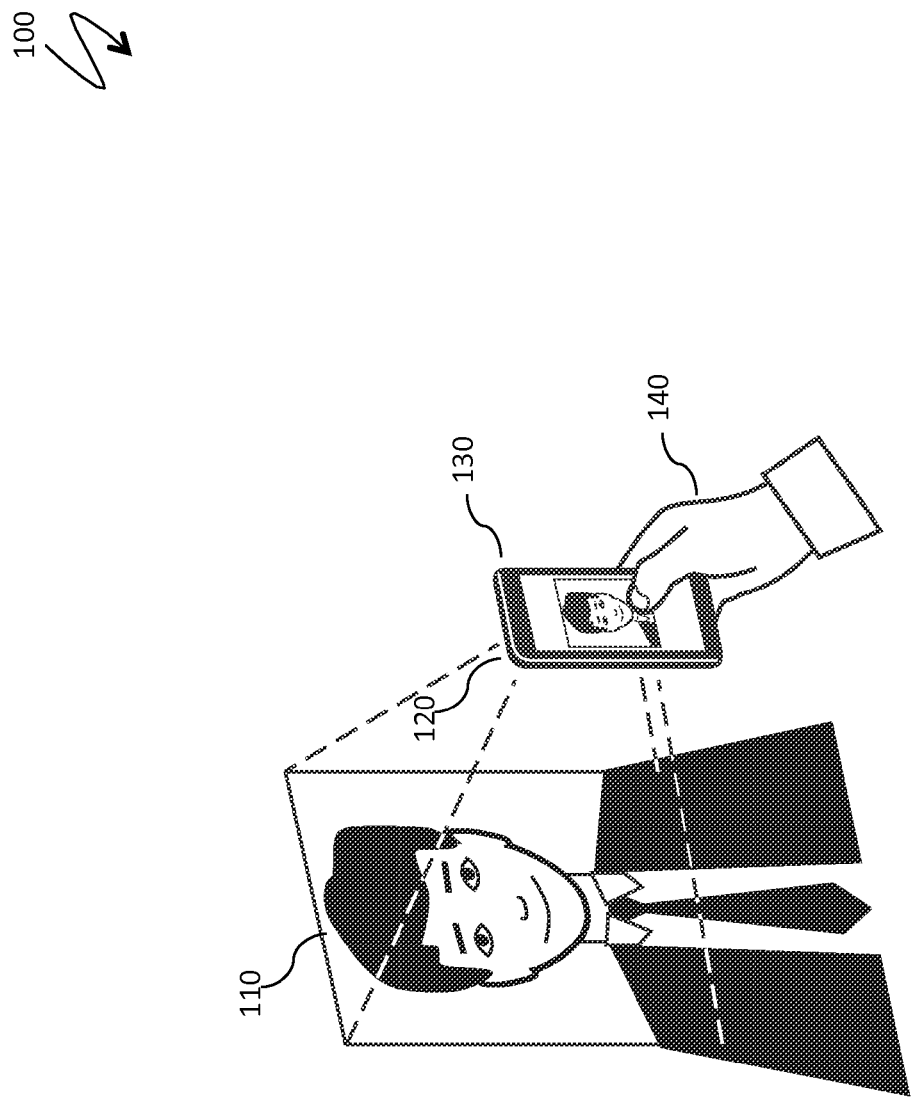
FIGS. 1A-1B are schematic illustrations of different methods of capturing of an initial frame set, according to an embodiment of to the system described herein.

FIG. 1A is a schematic illustration 100 of a capturing method for an initial frame set using a short video clip recorded by another person with a smartphone back-facing camera. A person 110 is asked to behave naturally in view of a back-facing camera 120 of a smartphone 130 where another person 140 records a video clip of the person 110 while diversifying view angles and controlling recording quality.

Figure 1B:
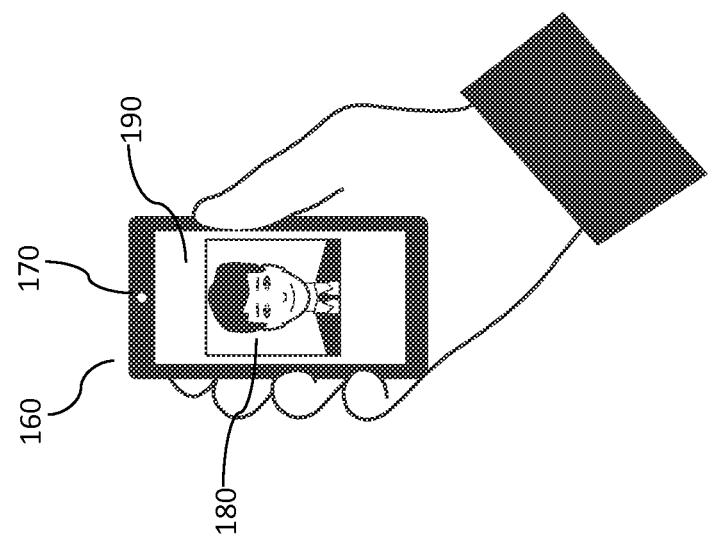

FIG. 1B is a schematic illustration 150 of a capturing method for an initial frame set using a series of still images self-recorded by a person with a smartphone front-facing camera. A smartphone 160 held by a photographed person is supplied with a front-facing camera 170; a current view 180 is displayed on a smartphone screen 190 where the system may also display instructions and recommendations for the photographed person.

Figure 2:
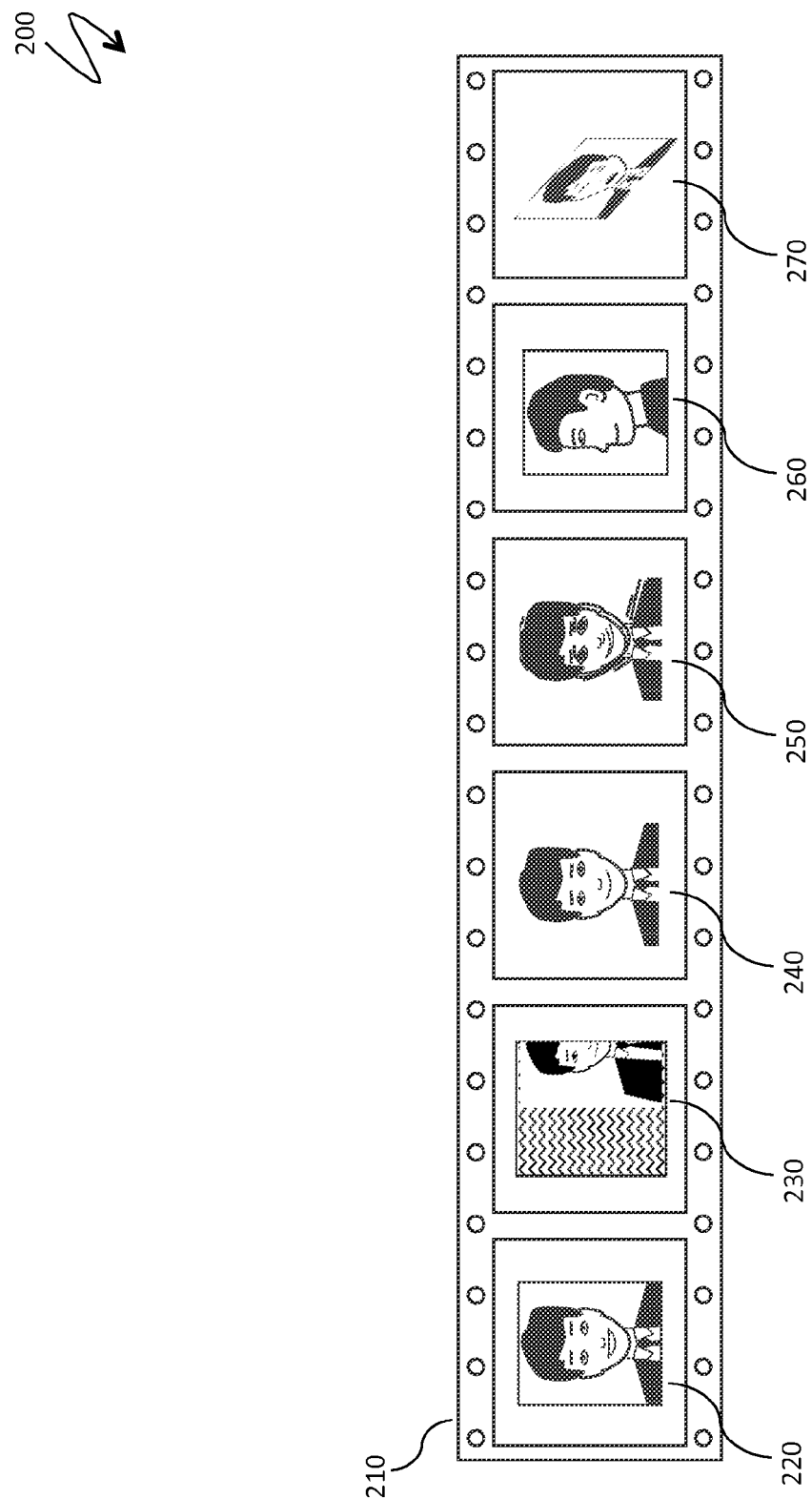
FIG. 2 is a schematic illustration of a captured frame set with different types of frames according to an embodiment of the system described herein.

FIG. 2 is a schematic illustration 200 of a captured frame set showing different types of frames. An initial frame set schematically shown as a film strip 210 contains different categories of frames, some of which may be dropped at different processing steps, while the rest of frames may be used for a final choice of facial photos. Thus, frames 220, 240 illustrate acceptable quality front views (full face views) with different facial expressions; a frame 260 is another acceptable quality frame with a side view (profile view). In contrast, each of three frames 230, 250, 270 show frames of unacceptable quality with different types of defects: on the frame 230, the face is cut off by the right boundary; on the frame 250, the image is blurry; and on the frame 270, a facial image is viewed at an extreme angle leaving too little of a recognizable facial area. Note that an order and adjacency of the frames 220, 230, 240, 250, 260, 270 are presented here for the illustration purpose only; the frames 220, 230, 240, 250, 260, 270 do not have to be adjacent or follow each other in any particular order.

Figure 3:
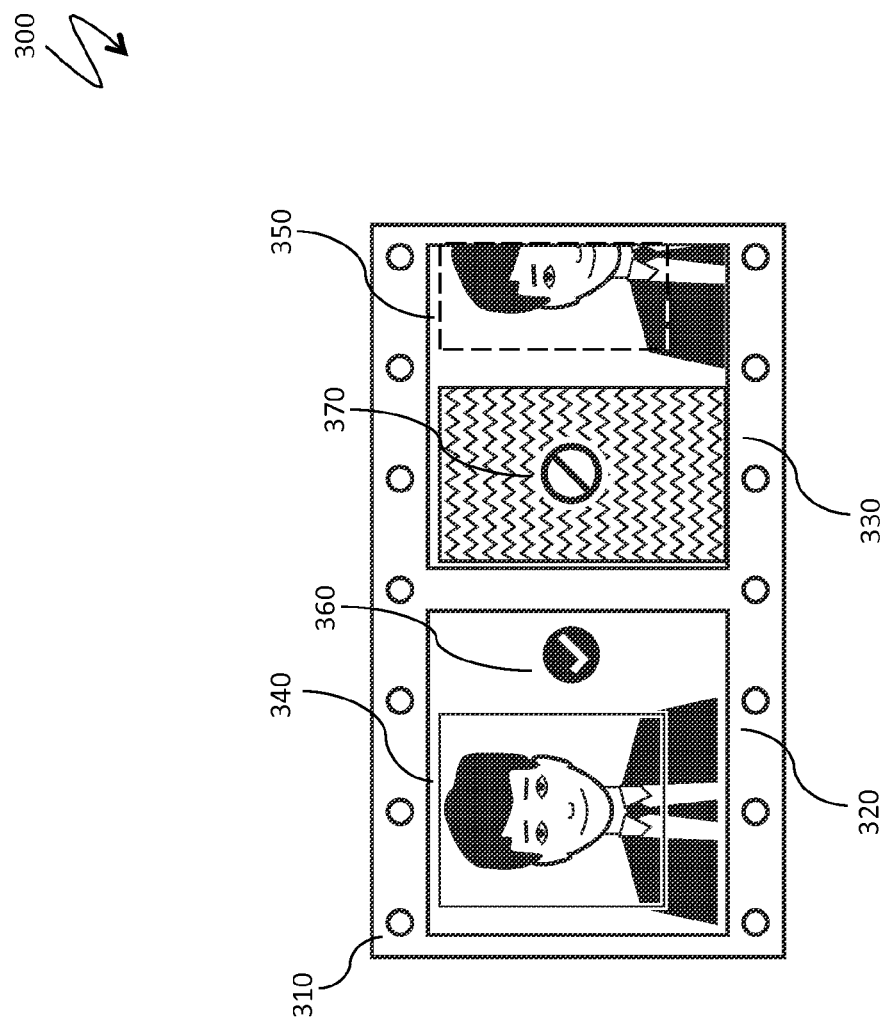
FIG. 3 is a schematic illustration of face detection on captured frames and dropping defective frames with incomplete facial images according to an embodiment of the system described herein.

FIG. 3 is a schematic illustration 300 of face detection on frames of the initial frame set with subsequent deletion of defective frames that include incomplete facial images of a person. An original frame set 310 is presented with two frames 320, 330. Face detection software is applied to all frames, as shown schematically by inner face borders 340, 350. It should be noted that contemporary software applications for face detection are not necessarily restricted to full face views on photos, which are shown on FIG. 3 in front views for illustration purposes. Additionally, face detection is facilitated by known technical parameters and settings of the smartphone camera and the recording session and by the fact that the frames normally have only one facial image of the photographed person, which occupies a significant portion of a frame area. In FIG. 3, a first border 340 delimits a complete facial image and is retained for subsequent processing, as symbolically shown by a checkbox 360. A second border 350 delimits an incomplete facial image; the border 350 is cut off at the right side. Therefore, the second frame 330 is dropped from the frame set, as symbolically shown by a no-go sign 370. (The two symbols: checkbox and no-go sign will be used throughout the rest of the drawings in a similar manner to facilitate the description herein.)

Figure 4:
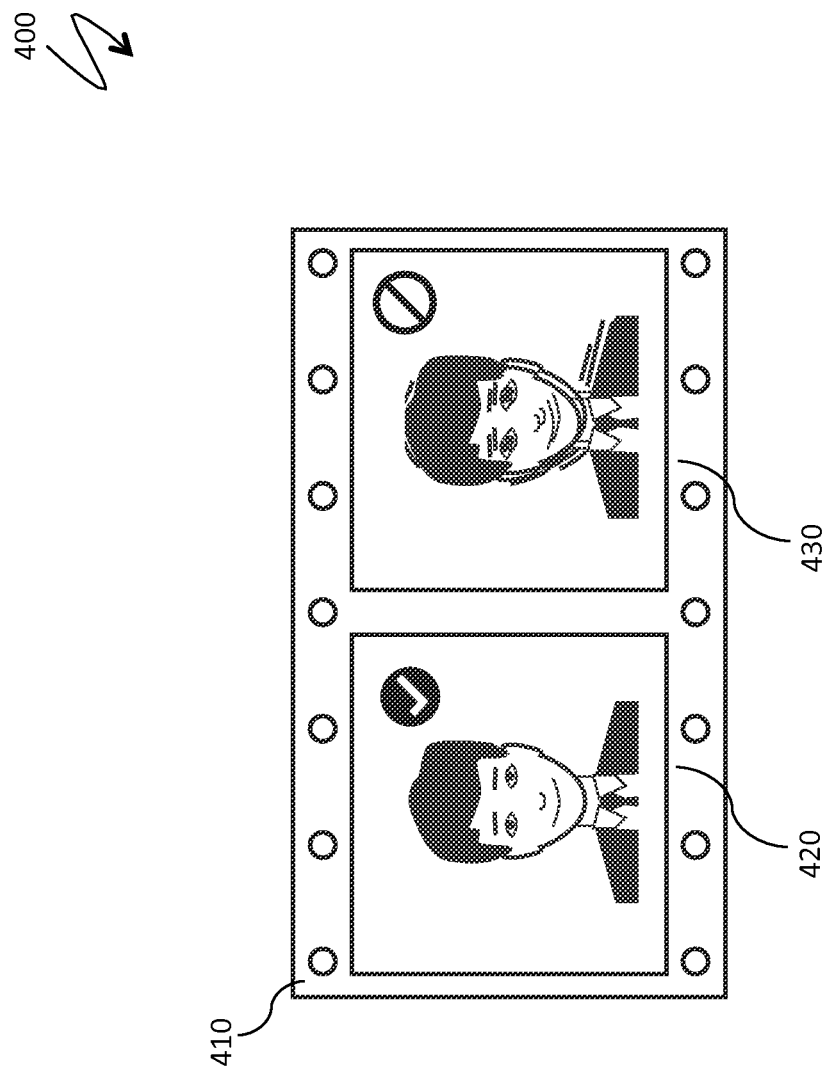
FIG. 4 is a schematic illustration of filtering out frames with low quality facial images according to an embodiment of the system described herein.

FIG. 4 is a schematic illustration 400 of an automatic analysis of the remaining frames and filtering out frames with low quality facial images. The modified set of frames 410, after the removal of incomplete facial images, is schematically presented in FIG. 4 as consisting of two characteristic frames: a frame 420 has acceptable image quality in terms of contrast, lighting and depth of field (DOF). In contrast, a frame 430 is defective, blurry and distorted. Obviously, there may be other image defects not shown here, such as lens glare, insufficient DOF, chromatic aberration, etc. It should be noted that modern methods for automatic assessment of image quality may be conditionally sub-divided into Full Reference (FR), Reduced Reference (RR) and No Reference (NR) methods depending on the use of reference images for comparison with sample images for the quality assessment purpose. In different embodiments of the proposed system, various methods may be used; in the event that FR or RR methods are employed, a manual step of marking good quality facial photo(s), taken with a specific smartphone camera may be added to the process for a particular session of capturing multiple facial photos or at the general settings level for future comparisons. As a result of the processing step illustrated in FIG. 4, frames with noticeable image quality defects, as illustrated by the frame 430, are dropped from the frame set. It should be also noted that image defects may be such that face detection software working at a previous processing step may not be able to identify the presence of a face on certain frames. In such a case, defective frames may be dropped from the frame set at the previous step illustrated in FIG. 3 rather than at the step illustrated in FIG. 4.

Figure 5:
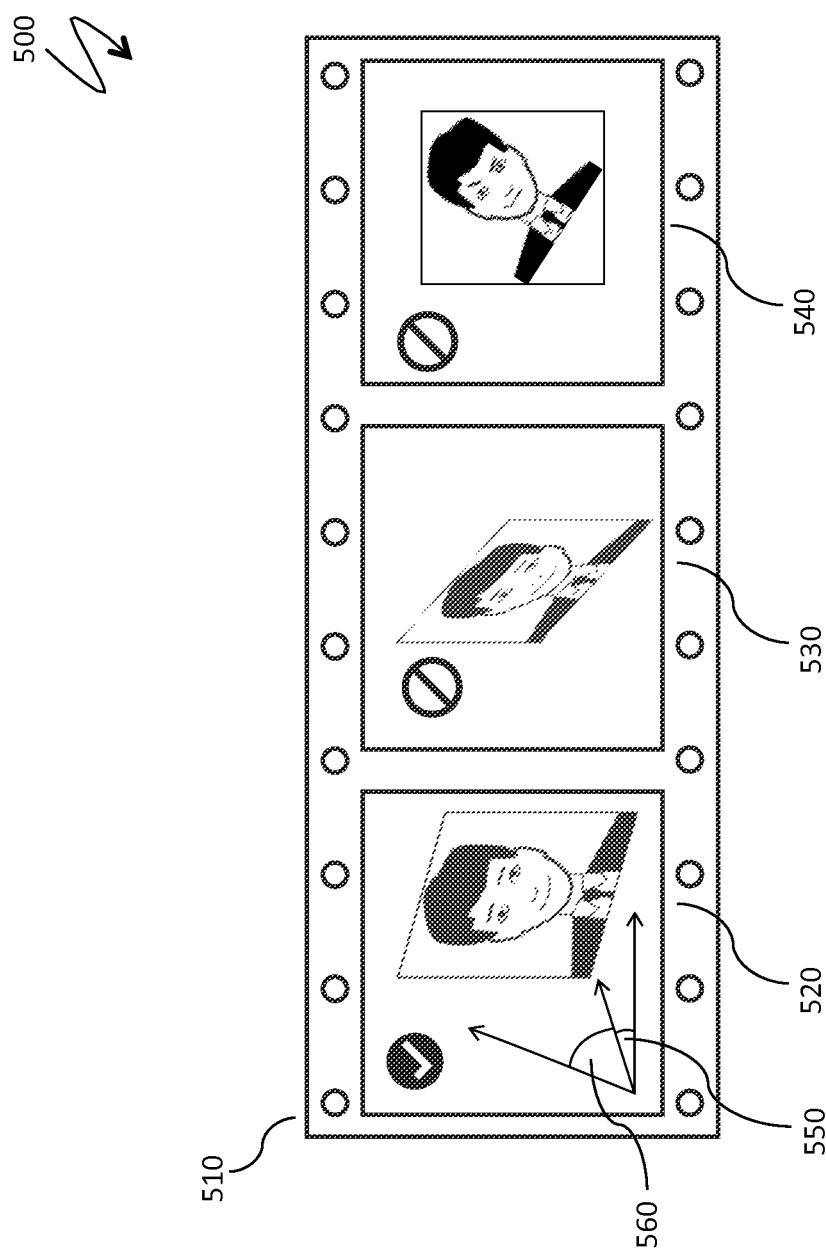
FIG. 5 is a schematic illustration of detecting view angles and dropping frames with extreme angles according to an embodiment of the system described herein.

FIG. 5 is a schematic illustration 500 of detection of view angles for facial images on remaining frames and a subsequent dropping of frames with extreme view angles. A current frame set 510 cleaned up at previous steps of processing, as explained elsewhere herein, is processed frame-by frame, and view angles with respect to facial images present on each frame are detected. Frames 530, 530, 540 retained from previous steps schematically show different view angles. A vector set shown on the frame 520, illustrates obtaining a horizontal view angle 550 and a vertical view angle 560. It should be noted that the depiction of the vector set and the view angles 550, 560 is for the illustration purpose only; the depiction does not show features, components or reference points on analyzed facial images used by the software for the calculation of the view angles 550, 560. The frame 520 is retained in the frame set, while the frames 530, 540 are deleted: the frame 530 is deleted because of an extreme vertical view angle and the frame 540 is deleted because of significant image rotation around the horizontal frontal view axis.

Figure 6:
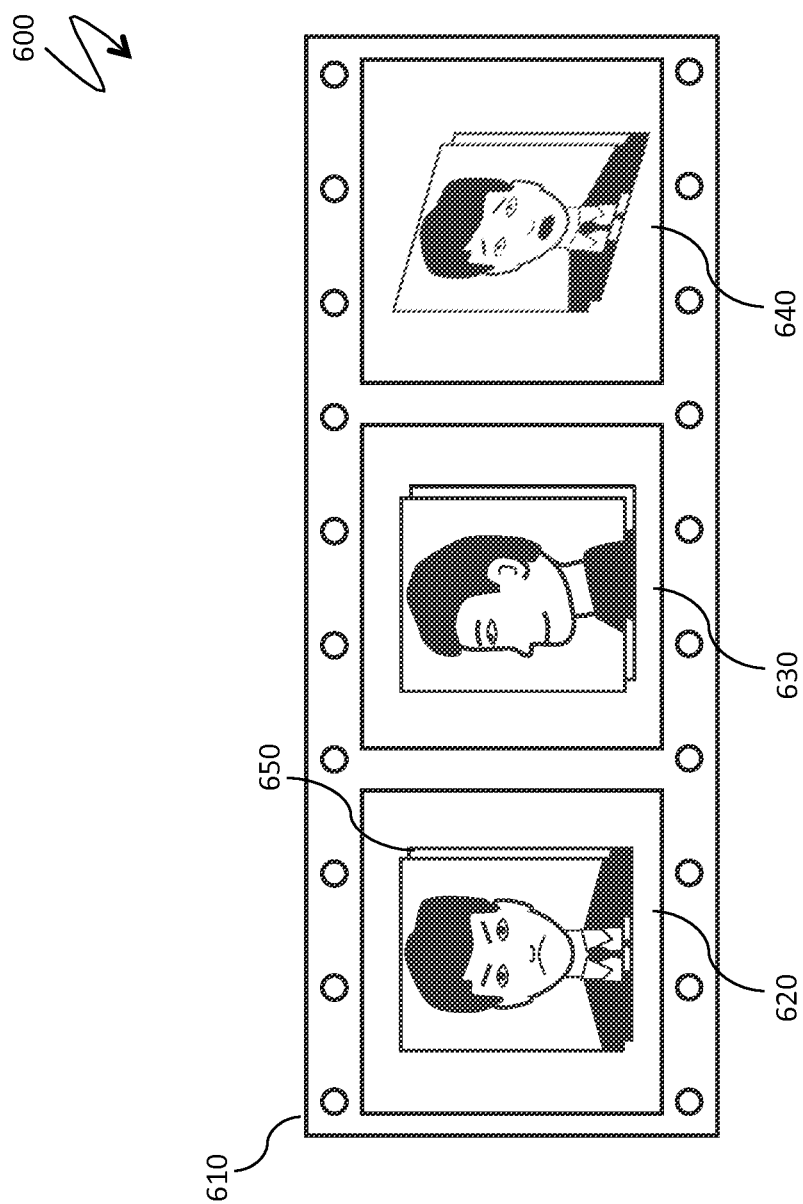
FIG. 6 is a schematic illustration of grouping frames by view angles according to an embodiment of the system described herein.

FIG. 6 is a schematic illustration 600 of grouping frames by conventional facial views. A current frame set 610 containing all frames retained from previous processing steps, as explained elsewhere herein, shows three batches of facial images grouped by full face view 620, profile view 630 and ⅔ view 640. The ⅔ view is schematically illustrated by a rotated front view. Categorization by vertical view angles, such as a straight or an elevated view, may also be part of the grouping. A multiplicity of images in each batch is shown by a double border 650. Grouping frames by facial view angles facilitates selection of a set of most representative images that show both a diversity of facial expressions and a diversity of view angles.

Figure 7:
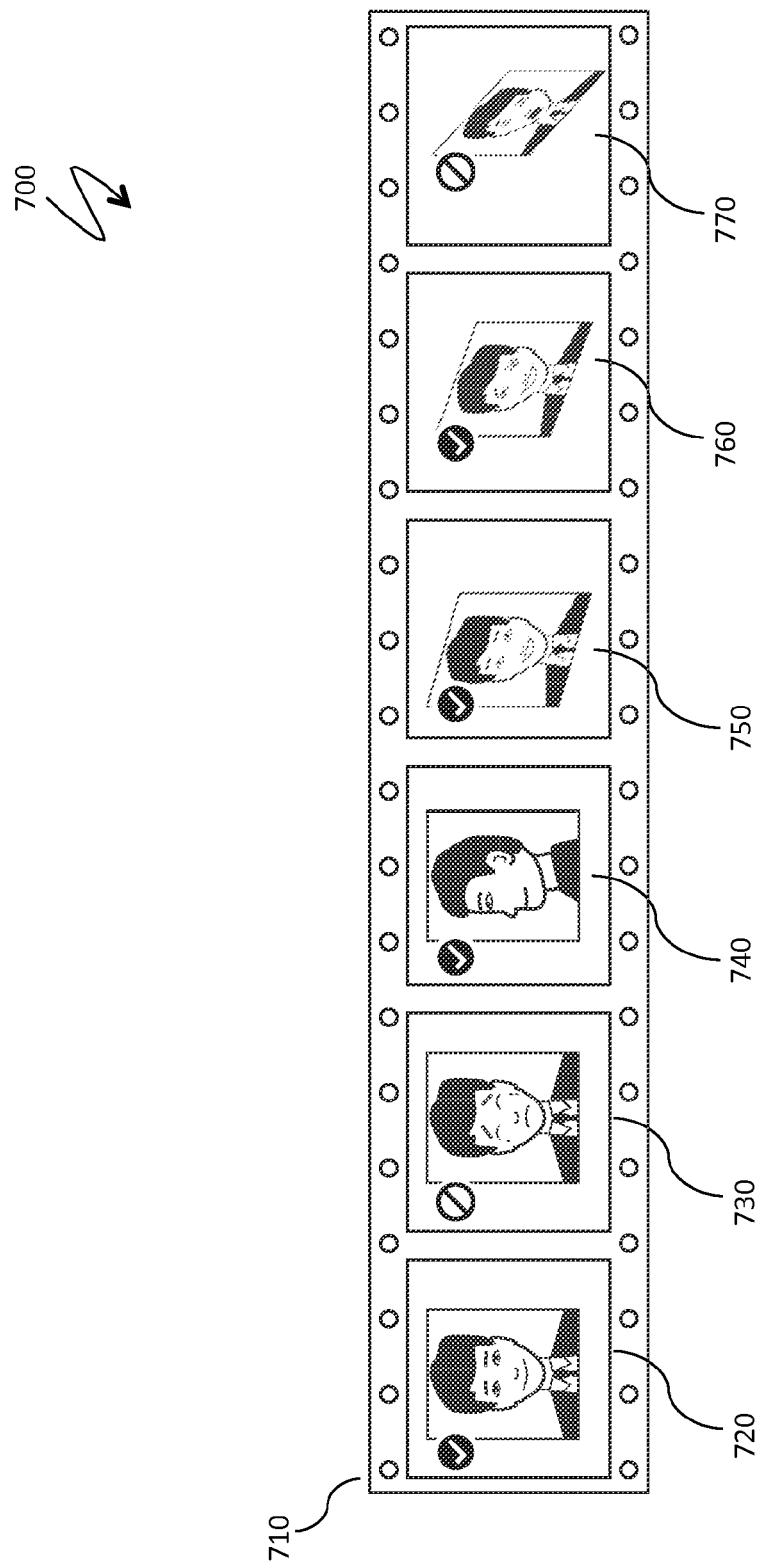
FIG. 7 illustrates detection of facial expressions on frames with different view angles according to an embodiment of the system described herein.

FIG. 7 is a schematic illustration 700 showing detection of facial expressions on frames with different facial photos. Since frames in a current frame set 710 have been previously grouped by view angles, depiction of the frames in FIG. 7 is shown in three batches: frames 720, 730 show two different expressions for a full face view, frame 740 shows an expression for a profile view, while frames 750, 760, 770 illustrate different facial expressions for the ⅔ view (or the ¾ view), schematically illustrated as rotated front views. It should be noted that a list of facial expressions, or moods, may use characteristic facial elements, keypoints and/or other features of automatic facial expression recognition systems and may depend on the available options in a third party software employed within the system. Facial expressions on the facial images 730, 770 may be qualified as undesirable and may be deleted from the frame set. In an embodiment herein, undesirable facial expressions may include one or more of, surprise, fear, anger, disgust, and sadness.

Figure 8:
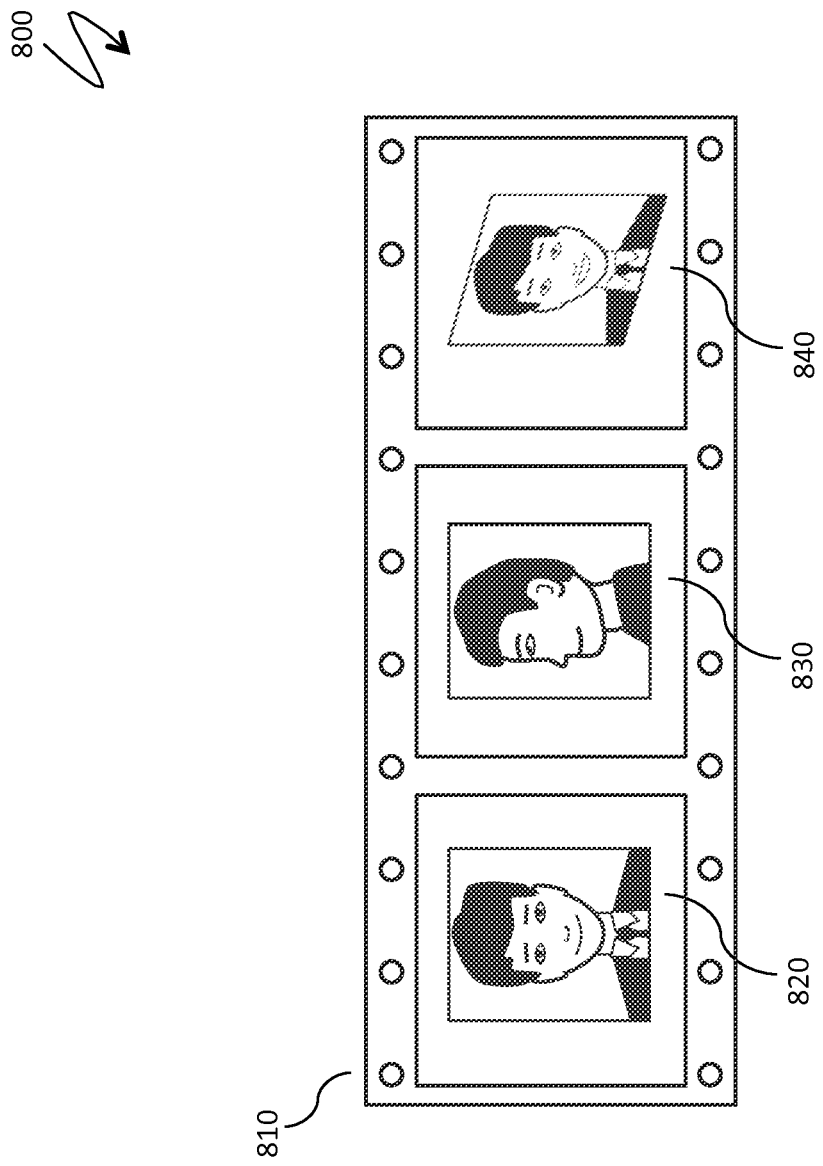
FIG. 8 illustrates an automatic choice of a limited set of most representative facial photos according to an embodiment of the system described herein.

FIG. 8 is a schematic illustration 800 of an automatic choice of a limited set of representative facial photos from the previous step. In this example, a choice 810 of multiple facial photos includes three different expressions combined with three different view angles.

In an embodiment, selection of multiple photos for a contact profile may be based on an aggregated articulacy/diversity value of a subset of photos in a two-component multi-dimensional space of facial expressions and view angles. The system may select subsets with a pre-defined maximum number of photos that maximize the articulacy/diversity value. Specifically, an articulacy value of a particular facial expression or a view angle in a photo may be defined as closeness of a photo to ideal prototypes; this can be denoted, for example, as (happiness/0.9) or (full face/0.7). The articulacy values may be represented as scores of alternative outcomes calculated by corresponding software. In this model, a quantitative representation of a photo for selection purposes is a pair of vectors P=(E, V) where the coordinate values of the vectors are equal to the articulacy values for the sets of acceptable expressions and view angles. A next component of the model may be represented by two dissimilarity matrices $D^E$, $D^V$, one of them measuring dissimilarities between expressions and another between view angles (two analogs of a distance between ideal prototypes of facial expressions and between different view angles). For example, a dissimilarity value between core expressions, such as happiness, neutrality or surprise, may be assigned a binary value: one for different expressions and zero otherwise. In contrast, dissimilarity between view angles may be non-binary; for example, it may be set to one between full face and profile views, 0.5 between an intermediate view angle (⅔ view, ¾ view, etc.) and either of the full face and the profile view, 0.25 between any different intermediate view angles, and zero otherwise. With this model, an articulacy/dissimilarity value for each of the vectors E, V characterizing two photos P1, P2 in a frame set chosen at FIG. 7 may be defined as a bilinear form or a double matrix/vector product—symbolically, $E(P1)^{T_o} D^{E_o} E(P2)$ and $V(P1)^{T_o} D^{V_o} V(P2)$, where $^o$ stands for matrix multiplication and E(P1), E(P2), V(P1), V(P2) are the pairs of (E, V) vectors associated with the photos P1 and P2. An overall articulacy/dissimilarity value between two photos may be defined as a weighted sum or other aggregating function of the above two values, and an articulacy/diversity value of a subset of photos may be calculated as an average, a minimum or other aggregated function of articulacy/dissimilarity values between all pairs of photos in a subset.

For example, a subset of three photos {P1, P2, P3} with corresponding E, V vectors P1=(happiness/0.9, full face/0.7), P2=(neutral/0.6; ⅔ view/0.9) and P3=(surprise/0.7; profile/0.8) (coordinates for expressions and view angles not listed in each vector are equal to zero) and with the weights of facial expression (E) and the view angle (V) equal respectively to 1.0 and to 0.8, pairwise articulacy/dissimilarity values for expressions, view angles, and aggregated are shown in three tables below (rounded to two decimal signs):

| Expressions | P1 | P2 | P3 |
| --- | --- | --- | --- |
| P1 | 0 | 0.72 | 0.63 |
| P2 | 0.72 | 0 | 0.56 |
| P3 | 0.63 | 0.56 | 0 |

| View angles | P1 | P2 | P3 |
| --- | --- | --- | --- |
| P1 | 0 | 0.21 | 0.16 |
| P2 | 0.21 | 0 | 0.27 |
| P3 | 0.16 | 0.27 | 0 |

| Aggregated | P1 | P2 | P3 |
| --- | --- | --- | --- |
| P1 | 0 | 0.89 | 0.76 |
| P2 | 0.89 | 0 | 0.78 |
| P3 | 0.76 | 0.78 | 0 |

An overall articulacy/diversity value of the subset of photos {P1, P2, P3} calculated as an average of non-zero values in an aggregated table, is equal to 0.81. An articulacy/diversity value of the subset calculated as the minimum of non-zero values in the same table is equal to 0.76. The system scans through subsets of photos selected at FIG. 7 with predefined maximum number of photos in a subset and chooses one or more subsets with the highest articulacy/diversity values as illustrated on FIG. 8.

Figure 9:
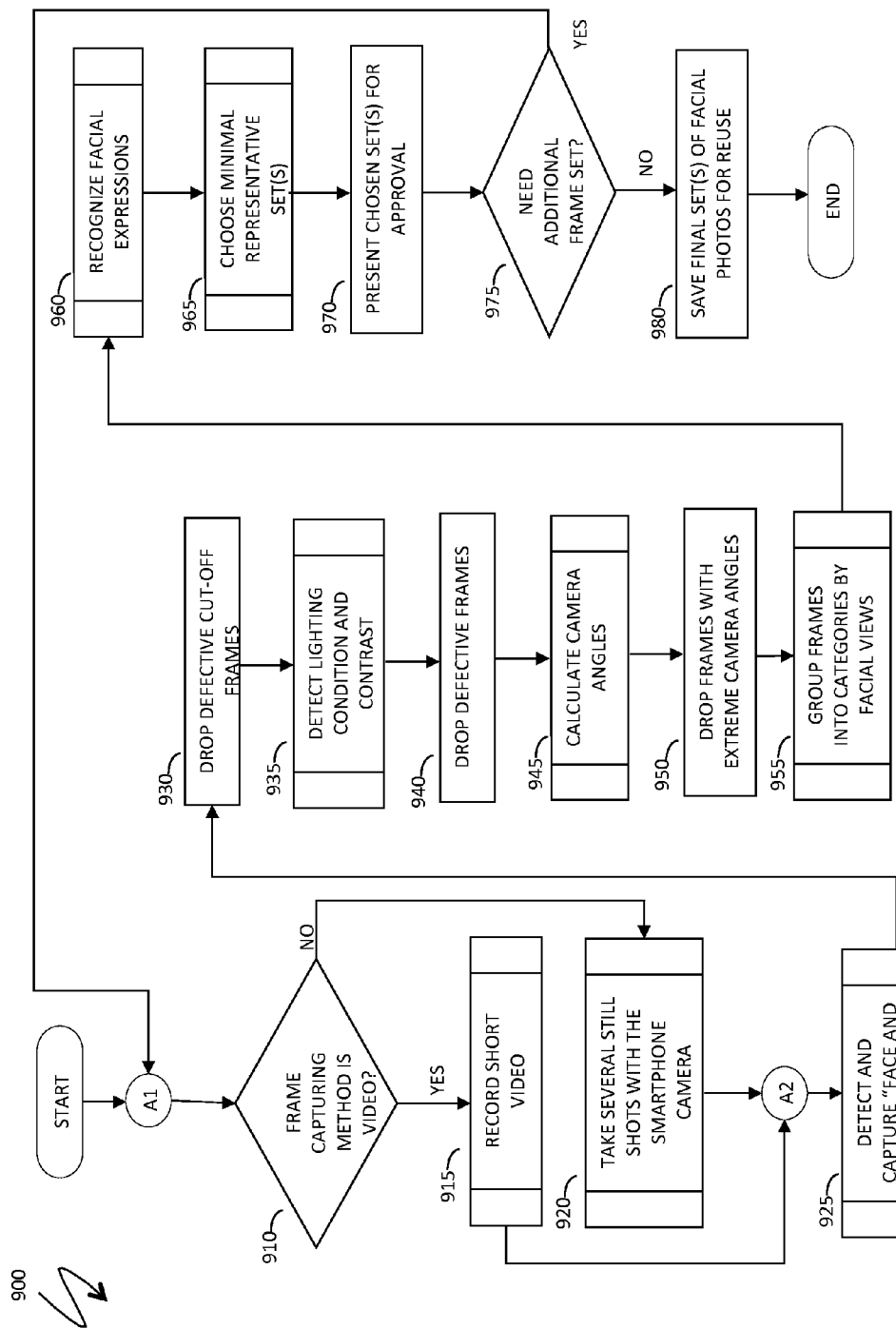
FIG. 9 is a principal system flow diagram according to an embodiment of the system described herein.

Referring to FIG. 9, a flow diagram 900 illustrates system functioning and shows system workflow for each of the steps described elsewhere herein. Processing begins at a test step 910 where it is determined if the frame capturing method is video. If so, then processing proceeds to a step 915 where a short video of the person is recorded. If not, then processing proceeds to a step 920 where several still shots with a smartphone camera are taken. Following either of the steps 915, 920, processing proceeds to a step 925 where the system detects and captures, on each frame, a face and shoulder portion of the an image of the person. Following the step 925 is a step 930 where the system detects frames where the head and shoulder portion is cut off by the frame boundary and is not present on the frame completely; the system deletes all such frames from the current frame set. Following the step 930 is a step 935 where an image processing technique is applied to images on retained frames to detect lighting conditions and contrast with subsequent assessment of the quality of facial images. Following the step 935 is a step 940 where frames with low quality images are dropped. It should be noted that, in different embodiments, either the FR (Full Reference) the NR (No Reference) or some other technique may be used for image quality assessment. The use of FR methods may require taking separate still images or marking certain frames for use as a reference material.

Following the step 940 is a step 945 where camera angles are calculated for the retained frame set. It should be noted that calculation at the step 945 is facilitated by knowing optical characteristics and the specific settings of the smartphone camera used for video recording or for taking separate still photos. Following the step 945 is a step 950 where frames with extreme camera angles (and facial views), such as a straight bottom-up, top-down or a rear view are deleted. Following the step 950 is a step 955 where the remaining frames are grouped into categories by facial views, such as front view (full face), side view (profile), ¾ view, ⅔ view, etc. Following the step 955 is a step 960 where facial recognition for remaining frames is performed using special software applications. Following the step 960 is a step 965 where automatic selection of a minimal representative set of facial photos is selected. It should be noted that, at the step 965, clustering may be used in conjunction with the distance calculations discussed elsewhere herein to select the desired number of photographs. Additionally, more than one optimal set of facial photos may be chosen at the step 965.

Following the step 965 is a step 970 where the chosen representative set(s) of facial photographs extracted from the initial frame set may be offered to the photographed person for approval. In some embodiments, this step may be optional and/or may only be required in embodiments where more than one optimal set of facial photos may be chosen. Following the step 970 is a test step 975 where it is determined if the identified set, in that person's view, is insufficient and therefore requires an additional frame set either in the form of a video clip or as a set of still photos. If so then control transfers from the step 975 back to the step 910; otherwise, following the step 975 is a step 980 where the final set(s) are saved in personal profiles of an owner of a personal contact space and/or a participant of an encounter. Following the step 980, processing is complete.

The system described herein may be used in connection with other electronic contact editing software, such as user contact software provided by the Microsoft Corporation of Redmond, Wash. in the Microsoft Office® software suite. For example, optimal photos may be selected and stored with contacts used with Outlook® messaging software. In such a case, a user may construct and/or edit an electronic contact entry in a conventional fashion (e.g., modify text fields according to instructions provided by the manufacturer) and then add to the electronic contact at least one of the optimal photographs provided according to the system described herein.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. The mobile device may be a cell phone, although other devices are also possible.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of extracting an optimal subset of facial photographs, comprising:
obtaining an initial set of facial photographs;
removing from the initial set of photographs any photographs that are of unacceptable quality;
grouping a remaining set of photographs according to lateral view angle of facial images on the photographs;
removing from the remaining set of photographs any photographs having an undesirable facial expression to provide a limited set of representative facial photographs; and
selecting, from the limited set of facial photographs, an optimal subset of facial photographs.

2. A method, according to claim 1, wherein obtaining the initial set of photographs includes using a video camera while diversifying view angles and controlling recording quality.

3. A method, according to claim 1, wherein obtaining the initial set of photographs includes obtaining a series of still images.

4. A method, according to claim 3, wherein the still images are self-recorded by a person with a smartphone front-facing camera.

5. A method, according to claim 1, wherein grouping the remaining set of photographs includes creating groups of photographs selected from a plurality of the following: photographs of a front full-face view, photographs of a profile view, photographs of a ¾ view, and photographs of a ⅔ view.

6. A method, according to claim 1, wherein removing photographs of unacceptable quality includes removing from the initial set of photographs any photographs having an incomplete facial view, any blurry photographs, and any photographs having an extreme angle leaving too little of a recognizable facial area.

7. A method, according to claim 1, wherein removing from the remaining set of photographs any photographs having an undesirable facial expression includes removing photographs showing at least one of: fear, anger, disgust, and sadness.

8. A method, according to claim 7, wherein facial expressions are automatically detected by software.

9. A method, according to claim 1, wherein selecting, from the limited set of facial photographs, an optimal subset of facial photographs includes having a user review several suboptimal candidate sets of facial photographs and manually select the optimal set of photographs therefrom.

10. A method, according to claim 1, wherein selecting, from the limited set of facial photographs, an optimal subset of facial photographs includes using closeness of the limited set of facial photographs to ideal prototypes for particular facial expressions and angles and diversity of facial expressions of the limited set of facial photographs in a two-component multi-dimensional space of facial expressions and view angles.

11. A method of editing an electronic contact, comprising:
modifying text fields of the electronic contact;
removing from an initial set of photographs any photographs that are of unacceptable quality;
grouping a remaining set of photographs according to lateral view angle of facial images on the photographs;
removing from the remaining set of photographs any photographs having an undesirable facial expression to provide a limited set of representative facial photographs;
selecting, from the limited set of facial photographs, an optimal subset of facial photographs; and
adding at least one photograph of the optimal subset of facial photographs to the electronic contact.

12. A method, according to claim 11, wherein the initial set of photographs includes frames obtained by using a video camera while diversifying view angles and controlling recording quality.

13. A method, according to claim 11, wherein the initial set of photographs includes a series of still images.

14. A method, according to claim 13, wherein the still images are self-recorded by a person with a smartphone front-facing camera.

15. A method, according to claim 11, wherein grouping the remaining set of photographs includes creating groups of photographs selected from a plurality of the following: photographs of a front full-face view, photographs of a profile view, photographs of a ¾ view, and photographs of a ⅔ view.

16. A method, according to claim 11, wherein removing photographs of unacceptable quality includes removing from the initial set of photographs any photographs having an incomplete facial view, any blurry photographs, and any photographs having an extreme angle leaving too little of a recognizable facial area.

17. A method, according to claim 11, wherein removing from the remaining set of photographs any photographs having an undesirable facial expression includes removing photographs showing at least one of: fear, anger, disgust, and sadness.

18. A method, according to claim 17, wherein facial expressions are automatically detected by software.

19. A method, according to claim 11, wherein selecting, from the limited set of facial photographs, an optimal subset of facial photographs includes having a user review several suboptimal candidate sets of facial photographs and manually select the optimal set of photographs therefrom.

20. A method, according to claim 11, wherein selecting, from the limited set of facial photographs, an optimal subset of facial photographs includes using closeness of the limited set of facial photographs to ideal prototypes for particular facial expressions and angles and diversity of facial expressions of the limited set of facial photographs in a two-component multi-dimensional space of facial expressions and view angles.

21. A non-transitory computer-readable medium containing computer software that extracts an optimal subset of facial photographs, the software comprising:
executable code that removes from an initial set photographs any photographs that are of unacceptable quality;
executable code that groups a remaining set of photographs according to lateral view angle of facial images on the photographs;
executable code that removes from the remaining set of photographs any photographs having an undesirable facial expression to provide a limited set of representative facial photographs; and
executable code that selects, from the limited set of facial photographs, an optimal subset of facial photographs.

22. A non-transitory computer-readable medium, according to claim 21, wherein the initial set of photographs includes frames obtained using a video camera while diversifying view angles and controlling recording quality.

23. A non-transitory computer-readable medium, according to claim 21, wherein the initial set of photographs includes a series of still images.

24. A non-transitory computer-readable medium, according to claim 23, wherein the still images are self-recorded by a person with a smartphone front-facing camera.

25. A non-transitory computer-readable medium, according to claim 21, wherein executable code that groups the remaining set of photographs creates groups of photographs selected from a plurality of the following: photographs of a front full-face view, photographs of a profile view, photographs of a ¾ view, and photographs of a ⅔ view.

26. A non-transitory computer-readable medium, according to claim 21, wherein executable code that removes photographs of unacceptable quality removes from the initial of set photographs any photographs having an incomplete facial view, any blurry photographs, and any photographs having an extreme angle leaving too little of a recognizable facial area.

27. A non-transitory computer-readable medium, according to claim 21, wherein executable code that removes from the remaining set of photographs any photographs having an undesirable facial expression removes photographs showing at least one of: fear, anger, disgust, and sadness.

28. A non-transitory computer-readable medium, according to claim 21, wherein executable code that selects, from the limited set of facial photographs, an optimal subset of facial photographs uses closeness of the limited set of facial photographs to ideal prototypes for particular facial expressions and angles and diversity of facial expressions of the limited set of facial photographs in a two-component multi-dimensional space of facial expressions and view angles.

29. A non-transitory computer-readable medium containing software that edits an electronic contact, the software comprising:
    executable code that modifies text fields of the electronic contact;
    executable code that removes from an initial set of photographs any photographs that are of unacceptable quality;
    executable code that groups a remaining set of photographs according to lateral view angle of facial images on the photographs;
    executable code that removes from the remaining set of photographs any photographs having an undesirable facial expression to provide a limited set of representative facial photographs;
    executable code that selects, from the limited set of facial photographs, an optimal subset of facial photographs; and
    executable code that adds at least one photograph of the optimal subset of facial photographs to the electronic contact.

30. A non-transitory computer-readable medium, according to claim 29, wherein the initial set of photographs includes frames obtained using a video camera while diversifying view angles and controlling recording quality.

31. A non-transitory computer-readable medium, according to claim 29, wherein the initial set of photographs includes a series of still images.

32. A non-transitory computer-readable medium, according to claim 31, wherein the still images are self-recorded by a person with a smartphone front-facing camera.

33. A non-transitory computer-readable medium, according to claim 29, wherein executable code that groups the remaining set of photographs creates groups of photographs selected from a plurality of the following: photographs of a front full-face view, photographs of a profile view, photographs of a ¾ view, and photographs of a ⅔ view.

34. A non-transitory computer-readable medium, according to claim 29, wherein executable code that removes photographs of unacceptable quality removes from the initial of set photographs any photographs having an incomplete facial view, any blurry photographs, and any photographs having an extreme angle leaving too little of a recognizable facial area.

35. A non-transitory computer-readable medium, according to claim 29, wherein executable code that removes from the remaining set of photographs any photographs having an undesirable facial expression removes photographs showing at least one of fear, anger, disgust, and sadness.

36. A non-transitory computer-readable medium, according to claim 29, wherein executable code that selects, from the limited set of facial photographs, an optimal subset of facial photographs uses closeness of the limited set of facial photographs to ideal prototypes for particular facial expressions and angles and diversity of facial expressions of the limited set of facial photographs in a two-component multi-dimensional space of facial expressions and view angles.

* * * * *